US012700526B2

(12) United States Patent (10) Patent No.: US 12,700,526 B2
Yamamoto et al. (45) Date of Patent: Aug. 4, 2026

(54) LAMINATE AND METHOD FOR MANUFACTURING THE SAME

(71) Applicants: JX NIPPON MINING & METALS CORPORATION, Tokyo (JP); TOHOKU MAGNET INSTITUTE CO., LTD., Miyagi (JP)

(72) Inventors: Yukito Yamamoto, Ibaraki (JP); Kazuyuki Satoh, Ibaraki (JP); Konosuke Sawa, Tokyo (JP); Mitsuo Bito, Miyagi (JP)

(73) Assignee: JX Advanced Metals Corporation, Tokyo (JP)

( * ) Notice: Subject to any disclaimer, the term of this patent is extended or adjusted under 35 U.S.C. 154(b) by 62 days.

(21) Appl. No.: 18/284,238

(22) PCT Filed: Mar. 3, 2022

(86) PCT No.: PCT/JP2022/009221
§ 371 (c)(1),
(2) Date: Sep. 26, 2023

(87) PCT Pub. No.: WO2022/209565
PCT Pub. Date: Oct. 6, 2022

(65) Prior Publication Data
US 2024/0153685 A1 May 9, 2024

(30) Foreign Application Priority Data
Mar. 29, 2021 (JP) ................................. 2021-056051

(51) Int. Cl.
*H01F 1/153* (2006.01)
*B32B 15/01* (2006.01)
(Continued)

(52) U.S. Cl.
CPC ....... *H01F 1/15308* (2013.01); *B32B 15/015* (2013.01); *C22C 9/00* (2013.01);
(Continued)

(58) Field of Classification Search
None
See application file for complete search history.

(56) References Cited

U.S. PATENT DOCUMENTS 4,857,414 A 8/1989 Araki et al.
5,045,637 A 9/1991 Sato et al.
(Continued)

FOREIGN PATENT DOCUMENTS

CN 106922112 A 7/2017
CN 112442642 A 3/2021
(Continued)

OTHER PUBLICATIONS

ThoughtCo, "Table of Electrical Resistivity and Conductivity", <https://www.thoughtco.com/table-of-electrical-resistivity-conductivity-608499>, accessed Mar. 7, 2025.*
(Continued)

*Primary Examiner* — Xiaobei Wang
(74) *Attorney, Agent, or Firm* — Faegre Drinker Biddle & Reath LLP

(57) ABSTRACT

There is provided a laminate that improves the electromagnetic wave shielding effect in a low frequency region. A laminate includes at least one non-magnetic metal layer and at least one magnetic metal layer, wherein the at least one magnetic metal layer contains an amorphous phase.

16 Claims, 4 Drawing Sheets

(51) Int. Cl.

| | |
|---|---|
| *C22C 9/00* | (2006.01) |
| *C22C 38/00* | (2006.01) |
| *C22C 38/02* | (2006.01) |
| *C22C 38/16* | (2006.01) |
| *C22C 45/00* | (2023.01) |
| *C22C 45/02* | (2006.01) |
| *C22C 45/04* | (2006.01) |

(52) U.S. Cl.
CPC ............ *C22C 38/002* (2013.01); *C22C 38/02* (2013.01); *C22C 38/16* (2013.01); *C22C 45/008* (2013.01); *C22C 45/02* (2013.01); *C22C 45/04* (2013.01); *C22C 2200/02* (2013.01); *C22C 2202/02* (2013.01)

(56) References Cited

U.S. PATENT DOCUMENTS

| | | | |
|---|---|---|---|
| 5,260,128 | A | 11/1993 | Ishii et al. |
| 2005/0208798 | A1 | 9/2005 | Shimoda |
| 2008/0012493 | A1 | 1/2008 | Lee et al. |
| 2010/0014270 | A1 | 1/2010 | Liu |
| 2010/0043927 | A1 | 2/2010 | Makino |
| 2013/0306364 | A1 | 11/2013 | Suzuki et al. |
| 2017/0338008 | A1 | 11/2017 | Kurokawa et al. |
| 2018/0079177 | A1 | 3/2018 | Tanaka et al. |
| 2021/0062290 | A1* | 3/2021 | Marsilius ............ H01F 1/15333 |
| 2022/0007555 | A1 | 1/2022 | Ishihara |
| 2022/0172875 | A1* | 6/2022 | Saito ........................ C21D 6/00 |

FOREIGN PATENT DOCUMENTS

| | | | |
|---|---|---|---|
| JP | S62-256498 | A | 11/1987 |
| JP | 63262237 | A | 10/1988 |
| JP | 7290449 | A | 11/1995 |
| JP | 2000124654 | A | 4/2000 |
| JP | 2003285002 | A | 10/2003 |
| JP | 2004094522 | A | 3/2004 |
| JP | 2005104009 | A | 4/2005 |
| JP | 200821979 | A | 1/2008 |
| JP | 2010517305 | A | 5/2010 |
| JP | 4602680 | B2 | 12/2010 |
| JP | 201279806 | A | 4/2012 |
| JP | 2017028177 | A | 2/2017 |
| JP | 2017212239 | A | 11/2017 |
| JP | 6278922 | B2 | 2/2018 |
| JP | 2018113313 | A | 7/2018 |
| JP | 2019087665 | A | 6/2019 |
| JP | 2019153716 | A | 9/2019 |
| WO | 2010021130 | A1 | 2/2010 |
| WO | 2016068046 | A1 | 5/2016 |
| WO | 2020105543 | A1 | 5/2020 |

OTHER PUBLICATIONS

English machine translation of JP 2019-153716, EPO, accessed Mar. 8, 2025.*

Office Action of JP patent application No. 2023-033919 with translation, dated Dec. 12, 2024, 28 pages.

International Search Report for PCT/JP2022/009221 dated May 17, 2022; 4 pages.

Extended European Search Report for corresponding EP Application No. 22779790.9, issued Jan. 9, 2025, 12 pages.

CN Office Action for corresponding CN App. No. 202280007539.2 issued on Aug. 8, 2025, 12 pages.

* cited by examiner

LAMINATE AND METHOD FOR MANUFACTURING THE SAME

CROSS REFERENCE TO RELATED APPLICATIONS

The present invention claims the benefit of and priority to Japanese Patent Application No. 2021-056051 filed on Mar. 29, 2021 with the Japanese Patent Office, the entire contents of which are incorporated herein by reference in its entirety.

FIELD OF THE INVENTION

The present invention relates to a laminate. In particular, the present invention relates to a laminate that can constitute an electromagnetic wave shielding material used as a covering material or an exterior material for electric/electronic device.

BACKGROUND OF THE INVENTION

In recent years, interest in global environmental problems has been growing all over the world, and environment-friendly automobiles equipped with secondary batteries, such as electric automobiles and hybrid vehicles, are becoming more popular. Many of these vehicles adopt a method of obtaining driving force by converting a direct current (DC) generated by an on-board secondary battery into an alternating current (AC) via an inverter and then supplying the required power to an AC motor. Electromagnetic waves are generated due to the switching operation of the inverter or the like. Since electromagnetic waves interfere with the reception of in-vehicle audio equipment, wireless equipment, and the like, countermeasures have been taken to house an inverter, or an inverter together with a battery, a motor, or the like in a metal case to shield against electromagnetic waves (Patent Literature 1: Japanese Patent Application Publication No. 2003-285002).

Further, electromagnetic waves are radiated not only from automobiles but also from many electric and electronic devices including communication devices, displays, and medical devices. Electromagnetic waves may cause malfunction of precision equipment, and there is also concern about the influence on the human body. For this reason, various techniques have been developed to reduce the influence of electromagnetic waves using electromagnetic wave shielding materials. For example, a copper foil composite (laminate) obtained by laminating a copper foil and a resin film is used as an electromagnetic wave shielding material (Patent Literature 2: Japanese Patent Application Publication No. H07-290449). The copper foil has electromagnetic wave shielding properties, and the resin film is laminated to reinforce the copper foil. Also known is an electromagnetic wave shield structure in which metal layers are laminated on the inner side and outer side of an intermediate layer made of an insulating material (Patent Literature 3: Japanese Patent No. 4602680). Further, there is also known an optical member for shielding electromagnetic waves, comprising: a base substrate; and a laminated member formed on one surface of the base substrate and composed of a plurality of repeating unit films containing a metal layer and a high refractive index layer (niobium pentoxide) (Patent Literature 4: Japanese Patent Application Publication No. 2008-21979).

Furthermore, in recent years, due to the miniaturization and high efficiency of electric/electronic devices, the demand for electromagnetic wave shielding effect is increasing more and more. In particular, there are many cases where strong magnetic field noise is generated in the low frequency region (typically, the frequency region of 1 MHz or less) from electric/electronic devices related to power supply and drive, such as inverters around electric vehicle motors. Therefore, there is a need for an electromagnetic wave shielding material that provides a higher electromagnetic wave shielding effect.

Japanese Patent No. 6278922 (Patent Literature 5) discloses a technique for greatly improving the electromagnetic wave shielding effect. In this literature, there is proposed an electromagnetic wave shielding material having a structure in which at least three metal foils are laminated via insulating layers. In this electromagnetic wave shielding material, by laminating three or more metal foils, it is shown that even if the total thickness of the metal foils is the same, the shielding effect is remarkably improved compared to the case where the metal foil is a single layer or the case where two metal foils are laminated.

PRIOR ART

Patent Literature

[Patent Literature 1] Japanese Patent Application Publication No. 2003-285002
[Patent Literature 2] Japanese Patent Application Publication No. H07-290449
[Patent Literature 3] Japanese Patent No. 4602680
[Patent Literature 4] Japanese Patent Application Publication No. 2008-21979
[Patent Literature 5] Japanese Patent No. 6278922

SUMMARY OF THE INVENTION

In the method disclosed in Patent Literature 5, although the overall electromagnetic wave shielding effect is improved, the improvement of the shielding effect against magnetic field noise in the low frequency region is limited. When the inventors of the present invention searched for the cause, they found that the metal foil material itself, which has been conventionally used as an electromagnetic wave shielding material, has a low shielding effect against magnetic field noise in a low frequency region. Therefore, it is desired to develop a new material that can reduce magnetic field noise not only in the medium to high frequency range but also in the low frequency range.

In addition, the electromagnetic wave shielding material may need to be subjected to forming processes such as drawing or bending in order to conform to the shape of the electric/electronic device to which it is applied. In general, the thickness of the metal foil used for electromagnetic wave shielding materials is several μm to several tens of μm, so cracks are likely to occur during forming processes. Therefore, when forming processes are required, it is important to prevent the electromagnetic wave shielding material from cracking during forming processes. Therefore, if it is possible to provide a new material with improved formability so that it can be used in various forming processes, by processing the new material into an appropriate shape, the new material can provide electromagnetic wave shielding effects (especially reduction of magnetic field noise in the low frequency range) to more electric/electronic devices.

The present invention has been made in view of the above circumstances, and in one embodiment, one object of the present invention is to provide a laminate with improved electromagnetic wave shielding effect in the low frequency range while maintaining the electromagnetic wave shielding effect against magnetic field noise in the range from medium to high frequencies. Furthermore, in another embodiment, one object of the present invention is to provide a method for manufacturing such laminate.

As described above, the present inventors have discovered that conventional materials lack a shielding effect against magnetic field noise in the low frequency range. Then, as a result of intensive studies by the present inventors, they have found that, a laminate prepared by laminating a non-magnetic metal and an amorphous magnetic metal with low crystallinity have a high electromagnetic wave shielding effect in a wide range of frequencies from low to high frequencies. Furthermore, the inventors tried forming processes on this laminate into a predetermined shape, and found that cracks occurring in the laminate can be effectively reduced. Furthermore, the present inventors have found that by partially or wholly crystallizing the magnetic metal layer containing the amorphous magnetic metal, the electromagnetic wave shielding effect in the low frequency region can be further enhanced.

The present invention has been completed based on the above founding, and is exemplified as below.

[1]

A laminate comprising at least one non-magnetic metal layer and at least one magnetic metal layer, wherein at least one of the at least one magnetic metal layer comprises an amorphous phase.

[2]

The laminate according to [1], wherein the at least one magnetic metal layer comprising the amorphous phase has a crystallinity of 10% or more.

[3]

The laminate according to [1] or [2], wherein at least part of the laminate is forming processed.

[4]

The laminate according to any one of [1] to [3], wherein the at least one non-magnetic metal layer has a thickness of 4 to 100 μm.

[5]

The laminate according to any one of [1] to [4], wherein the at least one magnetic metal layer has a thickness of 4 to 100 μm.

[6]

The laminate according to any one of [1] to [5], wherein a total thickness of the at least one non-magnetic metal layer and the at least one magnetic metal layer is 15 to 150 μm.

[7]

The laminate according to any one of [1] to [6], wherein the at least one non-magnetic metal layer is selected from the group consisting of aluminum foil, aluminum alloy foil, copper foil and copper alloy foil.

[8]

The laminate according to any one of [1] to [7], wherein in the at least one magnetic metal layer comprising the amorphous phase, a total amount of Fe, Ni and Co is 65.0 to 90.0 at %, an amount of Cu is 0 to 2.0 at %, a total amount of Ti, Zr, Hf, V, Nb, Ta, Cr, Mo, W, Mn, Ag, Zn, Al, Sn, As, Sb, Bi and REM is 0 to 8.0 at %, and the rest is at least one selected from the group consisting of B, Si, P and C and impurities, and wherein a total amount of Fe, Ti, Zr, Hf, V, Nb, Ta, Cr, Mo, W, Mn, Co, Ni, Ag, Zn, Al, Sn, As, Sb, Bi and REM is 65.0 to 90.0 at %.

[9]

The laminate according to any one of [1] to [7], wherein in the at least one magnetic metal layer comprising the amorphous phase, a total amount of Fe, Ni and Co is 65.0 to 92.0 at %, an amount of Cu is 0 to 2.0 at %, a total amount of Ti, V, Ta, Cr, Mo, W, Mn, Ag, Zn, Al, Sn, As, Sb, Bi and REM is 0 to 8.0 at %, a total amount of B, Si, P and C is 0 to 10.0 at %, and the rest is at least one selected from the group consisting of Zr, Hf and Nb and impurities.

[10]

The laminate according to any one of [1] to [7], wherein in the at least one magnetic metal layer comprising the amorphous phase, an amount of Fe is 79.0 to 88.0 at %, an amount of B is 5.0 to 15.0 at %, an amount of Si is 0 to 8.0 at %, an amount of P is 1.0 to 8.0 at %, an amount of C is 0 to 5.0 at %, an amount of Cu is 0 to 1.4 at %, a total amount of Ti, Zr, Hf, V, Nb, Ta, Cr, Mo, W, Mn, Ag, Zn, Al, Sn, As, Sb, Bi and REM is 0 to 8.0 at %, a total amount of Fe, Ti, Zr, Hf, V, Nb, Ta, Cr, Mo, W, Mn, Co, Ni, Ag, Zn, Al, Sn, As, Sb, Bi and REM is 79.0 to 88.0 at %, and a total amount of Fe, B, Si, P, C, Cu, Ti, Zr, Hf, V, Nb, Ta, Cr, Mo, W, Mn, Co, Ni, Ag, Zn, Al, Sn, As, Sb, Bi and REM is 100%.

[11]

The laminate according to any one of [1] to [10], wherein an electrical conductivity of the at least one non-magnetic metal layer is $30.0 \times 10^6$ S/m or more, and a saturation magnetic flux density of the at least one magnetic metal layer comprising the amorphous phase is 1.50 T or more.

[12]

The laminate according to any one of [1] to [11], wherein the at least one non-magnetic metal layer and the at least one magnetic metal layer comprising the amorphous phase are in contact.

[13]

A method for manufacturing a laminate, comprising a lamination step of forming an unfired laminate by laminating a material comprising a non-magnetic metal and a material comprising an amorphous magnetic metal.

[14]

The method for manufacturing a laminate according to [13], further comprising a firing step of firing the unfired laminate such that a crystallinity of the amorphous magnetic metal in the unfired laminate is 40% or more.

[15]

The method for manufacturing a laminate according to [14], further comprising a forming process step of processing the unfired laminate into a predetermined shape before the firing step.

[16]

The method for manufacturing a laminate according to [15], further comprising a preliminary firing step of preliminarily firing the unfired laminate such that the crystallinity of the amorphous magnetic metal after preliminary firing is increased to between 10% to 75% before the forming process step.

[17]

The method for manufacturing a laminate according to any one of [13] to [16], wherein in the lamination step, the non-magnetic metal and the amorphous magnetic metal are bonded by a surface activated bonding method.

According to one embodiment of the present invention, it is possible to provide a laminate with improved electromagnetic wave shielding effect in the low frequency range while maintaining the electromagnetic wave shielding effect against magnetic field noise in the range from medium to high frequencies. As a result, it is possible to greatly reduce the noise mixed in electric/electronic devices. In addition, it is possible to reduce the weight and size of electric/electronic devices. According to another embodiment of the invention, it is possible to provide a method for manufacturing such a laminate.

DETAILED DESCRIPTION OF THE INVENTION

Hereinafter, embodiments of the present invention will now be described in detail. It should be understood that the present invention is not intended to be limited to the following embodiments, and any change, improvement or the like of the design may be appropriately added based on ordinary knowledge of those skilled in the art without departing from the spirit of the present invention.

1. Laminate

Figure 1A:
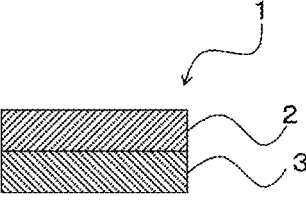
FIG. 1A is an example of a laminate according to one embodiment of the present invention.
Figure 1B:
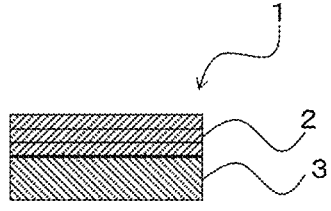
FIG. 1B is an example of a laminate according to one embodiment of the present invention.
Figure 1C:
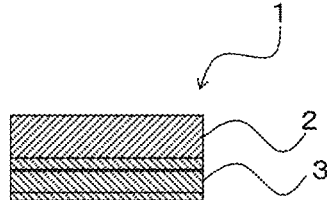
FIG. 1C is an example of a laminate according to one embodiment of the present invention.
Figure 1D:
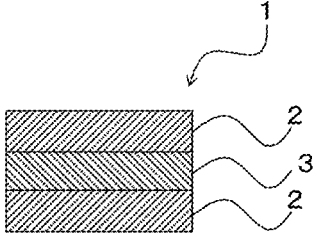
FIG. 1D is an example of a laminate according to one embodiment of the present invention.
Figure 1E:
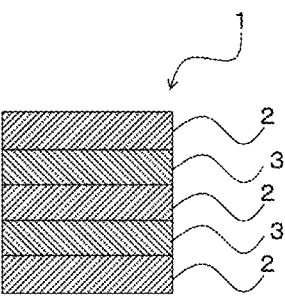
FIG. 1E is an example of a laminate according to one embodiment of the present invention.
Figure 1F:
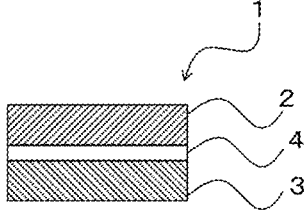
FIG. 1F is an example of a laminate according to one embodiment of the present invention.
Figure 1G:
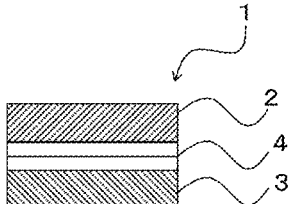
FIG. 1G is an example of a laminate according to one embodiment of the present invention.
Figure 1H:
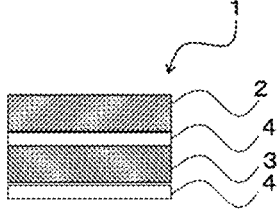
FIG. 1H is an example of a laminate according to one embodiment of the present invention.

As shown in FIG. 1A, a laminate 1 according to an embodiment of the present invention comprises a non-magnetic metal layer 2 and a magnetic metal layer 3, and the magnetic metal layer 3 comprises an amorphous phase. This laminate 1 can sufficiently shield electromagnetic waves in a wide frequency range from low frequencies to high frequencies. The non-magnetic metal layer 2 may be a single metal layer as shown in FIG. 1A, or may be a plurality of metal layers as shown in FIG. 1B. Similarly, the magnetic metal layer 3 may also be a single metal layer as shown in FIG. 1A, or may be a plurality of metal layers as shown in FIG. 1C. At least one non-magnetic metal layer 2 is sufficient, but as shown in FIGS. 1D and 1E, a plurality of layers may be provided according to the number of other layers. When the laminate 1 includes a plurality of non-magnetic metal layers 2, each non-magnetic metal layer 2 may have the same configuration or may have different configurations. Similarly, at least one magnetic metal layer 3 is sufficient, but as shown in FIG. 1E, a plurality of layers may be provided according to the number of other layers. When the laminate 1 includes a plurality of magnetic metal layers 3, each magnetic metal layer 3 may have the same configuration or may have different configurations. Note that the laminate 1 may include a non-metallic layer 4 as shown in FIG. 1F. This non-metallic layer 4 may be a single non-metallic layer or, may be a plurality of non-metallic layers, as shown in FIG. 1G. In addition, the number of non-metallic layers 4 may be one as shown in FIG. 1F, or may be plural according to the number of other layers, as shown in FIG. 1H. When the laminate 1 includes a plurality of non-metallic layers 4, each non-metallic layer 4 may have the same configuration or may have different configurations.

In order to enhance the electromagnetic wave shielding effect, the total thickness of the non-magnetic metal layer 2 and the magnetic metal layer 3 is preferably 15 μm or more. In addition, in order to improve formability, the total sum thereof is preferably 150 μm or less, more preferably 120 μm or less, even more preferably 80 μm or less, and most preferably 60 μm or less. Therefore, the thickness of the laminate 1 may be 15 to 150 μm.

From the viewpoint of cost, the number of non-magnetic metal layer 2 may be one. On the other hand, even if the total thickness of the non-magnetic metal layers 2 is the same, if the laminate 1 has a structure in which the magnetic metal layer 3 is present between the non-magnetic metal layers 2, the synergistic effect of the two layers on the electromagnetic wave shielding effect (for example, when the magnetic flux density fluctuates in the magnetic material, eddy currents are formed outside the magnetic flux concentration area to more reliably capture the magnetic flux, and there is an effect of preventing the generated electric field fluctuation from leaking outside the shield) enhances the electromagnetic wave shielding effect of the laminate 1. In addition, since the number of surfaces (surfaces where layers with different materials are in contact) on which electromagnetic waves are reflected can be increased, the number of times the electromagnetic waves are reflected increases, and the electromagnetic waves can be attenuated. Therefore, for the same electromagnetic wave shielding effect, the thickness of the laminate 1 can be reduced. Accordingly, it is preferable that there are two or more non-magnetic metal layers 2. In addition, from the viewpoint of cost, the number of non-magnetic metal layers 2 is preferably 5 or less, more preferably 4 or less, and most preferably 3 or less.

Similarly, from the viewpoint of cost, the number of magnetic metal layer 3 may be one. On the other hand, even if the total thickness of the magnetic metal layers 3 is the same, if the laminate 1 has a structure in which a non-magnetic metal layer 2 is present between the magnetic metal layers 3, the synergistic effect of the two layers on the electromagnetic wave shielding effect enhances the electromagnetic wave shielding effect of the laminate 1. In addition, since the number of surfaces (surfaces where layers with different materials are in contact) on which electromagnetic waves are reflected can be increased, the number of times the electromagnetic waves are reflected increases, and the electromagnetic waves can be attenuated. Therefore, for the same electromagnetic wave shielding effect, the thickness of the laminate 1 can be reduced. Accordingly, it is preferable that there are two or more magnetic metal layers 3. In addition, from the viewpoint of cost, the number of magnetic metal layers 3 is preferably 5 or less, more preferably 4 or less, and most preferably 3 or less.

In order to facilitate ground connection, it is preferable that the non-magnetic metal layer 2 and the magnetic metal layer 3 containing an amorphous phase are in contact, and it is more preferable that all the non-magnetic metal layer 2 and all the magnetic metal layer 3 are in contact. That is, it is preferable that the non-magnetic metal layers 2 and the magnetic metal layers 3 are laminated so as to be alternately arranged. In particular, it is preferable that the non-magnetic metal layer 2 containing a metal having a conductivity of $30.0 \times 10^6$ S/m or more and the magnetic metal layer 3 containing an amorphous phase are in contact.

In this specification, the non-magnetic metal layer 2 is defined as a metal layer having a volume magnetic susceptibility of −1.0 to 1.0 in SI units at 20° C., and it can be confirmed by not being attracted to an ordinary ferrite magnet even if the ferrite magnet is brought close. For example, such metals include copper (Cu), aluminum (Al), silver (Ag), gold (Au), tin (Sn), zinc (Zn), and alloys containing these listed elements as main components (for example, copper alloy). These materials also typically have a relative permeability of around 1 (0.9 to 1.1).

From the viewpoint of enhancing the shielding effect of the laminate 1 against AC magnetic fields and AC electric fields, it is preferable that the metal contained in the non-magnetic metal layer 2 has high electrical conductivity. Specifically, the electrical conductivity at 20° C. is preferably $1.0 \times 10^6$ S/m or more, more preferably $10.0 \times 10^6$ S/m or more, even more preferably $30.0 \times 10^6$ S/m or more, and most preferably $50.0 \times 10^6$ S/m or more. For example, such metals include aluminum with an electrical conductivity of about $33.0 \times 10^6$ S/m, copper with a conductivity of about $58.0 \times 10^6$ S/m, and silver with a conductivity of about $61.4 \times 10^6$ S/m. As the non-magnetic metal layer 2, various forms such as metal foil, plating, paste, and sputtering can be applied, but metal foil is practically easy to use. Considering both electrical conductivity and cost, it is practically preferred that the laminate contains aluminum or copper (for example, aluminum foil, aluminum alloy foil, copper foil, and copper alloy foil). In particular, it is preferable that the non-magnetic metal layer 2 comprises copper. The upper limit of electrical conductivity may be $200 \times 10^6$ S/m. Conductivity is determined by the four-probe method defined in JIS H0505 (1975).

When the non-magnetic metal layer 2 comprises a copper foil, the higher the purity of the copper is, the better the electromagnetic wave shielding effect of the laminate 1 is. Therefore, the purity of copper is preferably 99.5% by mass or more, more preferably 99.8% by mass or more. The purity of copper may be 100% by mass or less. In addition, in order to increase the elongation of the copper foil, the copper foil may contain at least one element selected from the group consisting of phosphorus (P), Sn, manganese (Mn), chromium (Cr), Zn, zirconium (Zr), magnesium (Mg), nickel (Ni), silicon (Si) and Ag as an optional element. When the copper foil contains P, the amount of P is preferably 50 mass ppm, more preferably 10 to 50 mass ppm. Further, when the copper foil contains at least one element selected from the group consisting of Sn, Mn, Cr, Zn, Zr, Mg, Ni, Si and Ag, the total amount of these elements is preferably 2000 mass ppm or less, more preferably 200 to 2000 mass ppm. For example, a copper foil may consist of 99.5% by weight or 99.8% by weight of copper, with the rest consisting of the above optional elements and impurities. The copper foil may be a rolled copper foil, an electrolytic copper foil, or a metallized copper foil. The copper foil is preferably a rolled copper foil because a rolled copper foil has excellent formability (in particular, bendability and drawability).

When a copper foil is used as the non-magnetic metal layer 2 and the thickness of the copper foil is sufficiently large, the strength and ductility of the non-magnetic metal layer 2 are sufficiently high, so that the formability of the laminate 1 can be improved. Therefore, it is preferable that the thickness of the non-magnetic metal layer 2 is 4 μm or more. Further, when the thickness of the non-magnetic metal layer 2 increases, the electromagnetic wave shielding effect of the non-magnetic metal layer 2 increases. Therefore, the thickness of the non-magnetic metal layer 2 is preferably 6 μm or more, more preferably 8 μm or more, and more preferably 10 μm or more. When the thickness of the non-magnetic metal layer 2 is sufficiently small, the strength of the non-magnetic metal layer 2 is sufficiently small, so that the formability of the laminate 1 can be sufficiently improved. Therefore, the thickness of the non-magnetic metal layer 2 is preferably 100 μm or less, more preferably 50 μm or less, even more preferably 45 μm or less, and most preferably 40 μm or less. When the laminate 1 includes a plurality of non-magnetic metal layers 2, it is possible that one non-magnetic metal layer 2 has a thickness within the above range, and it is possible that a part of the non-magnetic metal layers 2 have a thickness within the above range, and it is possible that all the non-magnetic metal layers 2 have a thickness within the above range.

In order to improve environmental resistance such as heat resistance and corrosion resistance, the non-magnetic metal layer 2 may contain one or more of Au, Ag, Sn, Zn, or an alloy (for example, as Sn alloys, Sn—Ag alloys, Sn—Ni alloys, and Sn—Cu alloys can be mentioned) containing these listed elements as main components. The elements listed above and their alloys are preferably present on the outermost surface of the laminate 1. From the viewpoint of cost reduction, the non-magnetic metal layer 2 preferably contains Sn or a Sn alloy. In addition, the non-magnetic metal layer 2 may have unevenness in order to improve adhesion between layers. The unevenness can be formed by, for example, a roughening treatment which will be described later. The laminate 1 may include a non-magnetic metal layer 2 composed of only the elements listed above and their alloys, and the thickness of this non-magnetic metal layer 2 is preferably 0.001 to 10 μm.

In this specification, the magnetic metal layer 3 is defined as a metal layer having a volume magnetic susceptibility of 10 or more in SI units at 20° C., and it can be confirmed by being attracted to an ordinary ferrite magnet if the ferrite magnet is brought close. For example, such metals include iron (Fe), nickel (Ni), cobalt (Co), and alloys containing these listed elements (for example, iron alloys such as Fe—Ni) as main components. These materials usually have a relative permeability well above 1 (for example, 5 to $10^6$).

Further, at least one of the magnetic metal layers 3 comprises an amorphous phase. Amorphous phase is a phase that does not have a definite crystal structure, and the magnetic metal layer 3 can be determined to contain an amorphous phase when a broad annular electron diffraction pattern is obtained as an electron diffraction pattern in a transmission electron microscope. In particular, when there is a large amount of amorphous phase, in addition to obtaining the electron diffraction pattern described above, it can be easily identified as a broad peak by an X-ray diffraction method which will be described below, so obtaining the diffraction pattern with a transmission electron microscope can be substituted. The magnetic metal layer 3 containing an amorphous phase includes, for example, an amorphous metal containing an amorphous phase alone or a nanocrystalline metal in which a crystal phase is dispersed in an amorphous phase. Such a magnetic metal layer 3 can control the magnetic anisotropy to be very small in the region corresponding to the width of the magnetic domain wall, and by effectively scattering the magnetic lines of force in the plane of the magnetic metal layer 3, the entire magnetic metal layer 3 can be used for shielding against the magnetic field. Therefore, low-frequency magnetic field noise can be efficiently reduced, which is effective in reducing the weight of the laminate 1. It should be note that, since an ordinary thin magnetic metal has a macroscopic directivity, there is a possibility that the magnetic permeability of the magnetic metal cannot be fully utilized.

From the viewpoint of enhancing the electromagnetic wave shielding effect of the laminate 1 against DC magnetic field or low-frequency magnetic field noise without increasing the dimensions of the laminate 1 (from the viewpoint of using the product near the optimum function position), it is preferable that the metal contained in the magnetic metal layer 3 has a high saturation magnetic flux density and a high relative permeability. Specifically, the saturation magnetic flux density at 20° C. is more preferably 0.50 T or more, preferably 1.00 T or more, more preferably 1.50 T or more, more preferably 1.60 T or more, and most preferably 1.70 T or more. The upper limit of saturation magnetic flux density may be 2.50 T. This saturation magnetic flux density is measured by a vibrating sample magnetometer (VSM). In addition, the maximum value of the differential relative permeability at 20° C. of the metal contained in the laminate 1 or the magnetic metal layer 3 is preferably 1000 or more, more preferably 2000 or more, and most preferably 5000 or more. The upper limit of this differential relative permeability may be $1.0 \times 10^6$. In the present specification, the differential relative permeability is defined as the value obtained by dividing the change in the magnetic flux density by the change in the magnetic field (14.4 A/m) and converting this value into the relative permeability (the value obtained by multiplying $10^7/4\pi$). This differential relative permeability is measured by a BH tracer. Further, the maximum value of the differential relative permeability is defined as the average value of the maximum value of the differential relative permeability in a predetermined direction (first differential relative permeability) and the differential relative permeability in a direction perpendicular to the predetermined direction (second differential relative permeability). Furthermore, in standard applications, it is important that the magnetic properties are non-directional (anisotropic), so that the product does not need to be designed for the electromagnetic environment. Therefore, it is desirable that the maximum value of the first differential relative permeability and the maximum value of the second differential relative permeability to be equal. For example, the value obtained by dividing the maximum value of the first differential relative permeability by the maximum value of the second differential relative permeability is preferably 0.90 to 1.10, more preferably 0.95 to 1.05, and most preferably 0.98 to 1.02. Further, for example, the value obtained by dividing the difference between the maximum value of the first differential relative permeability and the maximum value of the second differential relative permeability by the maximum value of the differential relative permeability is preferably 0.10 or less, more preferably 0.08 or less, and most preferably 0.05 or less.

If the magnetic metal layer 3 contains a metal crystal phase (crystal grain) of small size in addition to the amorphous phase, the saturation magnetic flux density can be increased without increasing the above-mentioned magnetic anisotropy and coercive force. The average crystal grain size of the crystal grains is preferably 60 nm or less, more preferably 30 nm or less, even more preferably 25 nm or less, even more preferably 20 nm or less, and most preferably 15 nm or less. This average crystal grain size may be 3 nm or more. This average crystal grain size can be obtained with the Scherrer method by analyzing the main peak of the metal crystal in the spectrum obtained by the X-ray diffraction (XRD) method. 0.90 is used as the Scherrer's constant in this Scherrer method.

Figure 2:
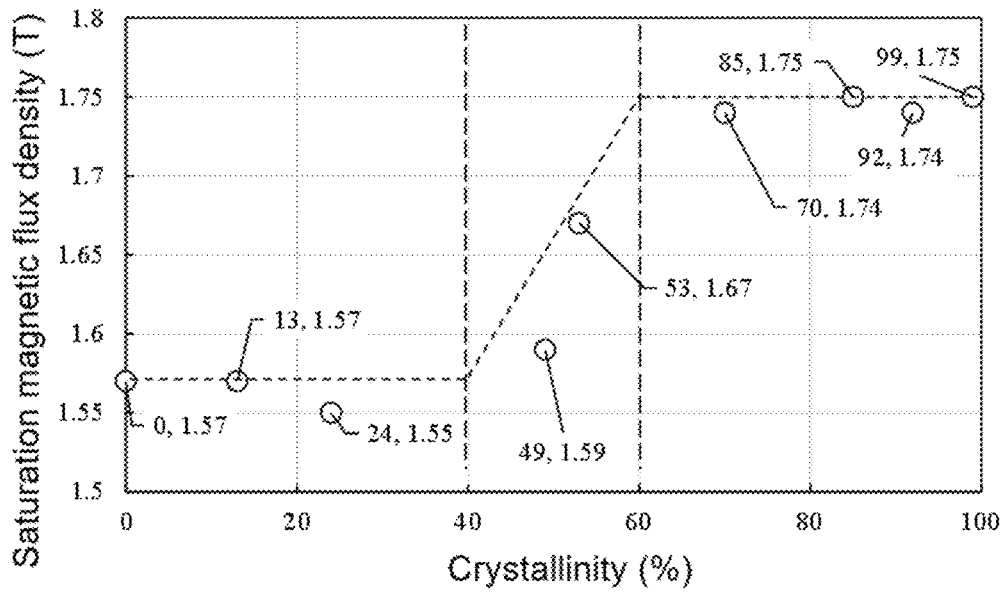
FIG. 2 is an example of the relationship between crystallinity and saturation magnetic flux density.

Also, as shown in FIG. 2 as an example of a material having a specific chemical composition (chemical composition of the Example) and a coercive force of 10 A/m or less, the more the amount of the crystal phase in the metal is, the more the saturation magnetic flux density increases. Therefore, it is desirable to increase the amount of crystal phase in the metal to the maximum available amount of metal crystal phase. When the crystallinity is defined as the amount of crystal phase in a metal relative to the maximum available amount of crystal phase in the metal, the crystallinity is preferably 10% or more, more preferably 20% or more, more preferably 30% or more, more preferably 40% or more, more preferably 50% or more, even more preferably 60% or more, more preferably 80% or more, and most preferably 90% or more. This crystallinity may be 100% or less. On the other hand, when the crystallinity increases, the magnetic metal layer 3 may become brittle and the formability of the laminate 1 may deteriorate. Therefore, when a forming process is required, the crystallinity before forming is preferably 75% or less, more preferably 60% or less. Considering the balance between both saturation magnetic flux density and formability, the crystallinity is preferably 10 to 75%, most preferably 40 to 60%. An ordinary thin magnetic metal is fragile, so cracks are likely to occur during forming processes. When cracks occur, the effect of the laminate 1 in reducing magnetic field noise is also reduced. At this time, magnetic field noise may leak from the crack. Note that the crystallinity is determined by a Differential Scanning calorimeter (DSC). In this DSC measurement, a total calorific value ΔH (all) (that is, 100%) is defined as the calorific value (calculated from peak area) due to the formation of the metallic crystal phase of the DSC curve obtained from the material having the metallic crystal phase ratio of 1% or less on both sides of the material (for example, material after liquid quenching and before crystallization). Similarly, the calorific value (calculated from peak area) due to the formation of the metallic crystal phase on the DSC curve obtained from the material to be measured is defined as the balance calorific value ΔH (bal). Then, the crystallinity is obtained by obtaining a value by subtracting the balance calorific value ΔH (bal) from the total calorific value ΔH (all), and dividing this value by the total calorific value ΔH (all) and then multiplying by 100 (that is, the crystallinity is calculated by (ΔH(all)−ΔH(bal))/ΔH(all)×100). In addition, when the peak due to the formation of the metallic crystal phase overlaps with the peak due to the phase other than the metallic phase such as a compound phase, the peak due to the formation of the metallic crystal phase is specified by performing peak separation. The metallic crystal phase ratio is defined as the ratio of the metallic crystal phase to all phases at the principal positions where the broad peak due to the amorphous phase is obtained. This metallic crystal phase ratio is determined by the crystallinity determination method disclosed in WO 2017/022594 using the spectrum obtained by XRD (that is, the value of X in this international publication is the metallic crystal phase ratio). In this XRD, if both surfaces can be measured, it is defined by the average value of both surfaces, if only one surface can be measured, it is defined on the one surface, and if the surfaces cannot be measured, it is defined at the center (half the thickness position). The metallic crystal phase ratio is preferably 10% or more, more preferably 20% or more, and most preferably 40% or more. This metallic crystal phase rate may be 99% or less, or may be 70% or less.

Furthermore, in order to reduce the residual magnetization in the magnetic metal layer 3, the coercive force at 20° C. is preferably 50 A/m or less, more preferably 20 A/m or less, even more preferably 10 A/m or less, and most preferably 5 A/m or less. This coercive force is measured by a BH tracer.

For example, in order to reduce the residual magnetization in the magnetic metal layer 3, it is desirable to sufficiently reduce the amount of compound phases (for example, $Fe_2B$ and $Fe_3P$). Preferably, the amount of these compound phases is reduced to such an extent that they are not detected in the spectrum obtained by XRD. For example, the method disclosed in WO 2017/022594 is used. That is, the compound crystal phase ratio is defined as the ratio of the compound phases to the all phases at the above principal positions (that is, the value of Y in this international publication is defined as the compound crystal phase ratio). The compound crystal phase ratio is preferably 2% or less, more preferably 1% or less. The compound crystal phase ratio may be 0% or more. When this compound phase increases, the amount of amorphous phase in the magnetic metal layer 3 decreases.

The magnetic metal layer 3 may contain a ribbon, or may contain a material obtained by forming powder into a layer. If the magnetic metal layer 3 is continuous, the leakage of magnetic flux is reduced, so the shielding ability of the laminate 1 is improved. Therefore, the magnetic metal layer 3 preferably contains a ribbon. Moreover, it is preferable that the ribbon is less likely to crack. In particular, it is preferable that there is no crack penetrating the magnetic metal layer 3.

Although the chemical composition of the metal contained in the magnetic metal layer 3 is not particularly limited, for example, the following chemical composition can be selected.

Fe, Ni, and Co have ferromagnetism and increase the saturation magnetic flux density. Therefore, the total amount of Fe, Ni and Co is preferably 65.0 to 100 at % (atomic %). When the metal contains an amorphous phase, the total amount of Fe, Ni and Co is preferably 65.0 to 92.0 at % from the viewpoint of the stability of the amorphous phase. For example, such metals include alloys containing at least one element selected from the group consisting of boron (B), Si, P and carbon (C) with at least one element selected from the group consisting of Fe, Ni and Co, and alloys containing at least one element selected from the group consisting of Zr, hafnium (Hf), and niobium (Nb) with at least one element selected from the group consisting of Fe, Ni and Co.

B, Si, P, C, Zr, Hf and Nb increase the thermal stability of the amorphous phase. Therefore, the total amount of B, Si, P, C, Zr, Hf and Nb is preferably 8.0 at % or more. On the other hand, in order to obtain a high saturation magnetic flux density, the total amount is preferably 35.0 at % or less. When thermal stability is imparted to the amorphous phase mainly by B, Si, P, and C which have atomic radii smaller than those of Fe, Ni, and Co, the total amount of B, Si, P, and C is preferably 10.0 at % or more, more preferably 12.0 at % or more, and most preferably 14.0 at % or more. On the other hand, in order to obtain a high saturation magnetic flux density, the total amount is preferably 35.0 at % or less, more preferably 20.0 at % or less, even more preferably 16.0 at % or less, and most preferably 15.0 at % or less. B, Si, P, and C each greatly increase the activity in the amorphous phase and greatly improve the stability of the amorphous phase, so two or more elements selected from the group consisting of B, Si, P, and C are preferred, three or more are more preferred, and four are most preferred. When thermal stability is imparted to the amorphous phase mainly by Zr, Hf, and Nb which have atomic radii larger than those of Fe, Ni, and Co, the total amount of Zr, Hf, and Nb is preferred 5.0 at % or more, and more preferably 8.0 at % or more. On the other hand, in order to obtain a high saturation magnetic flux density, the total amount is preferably 15.0 at % or less, more preferably 10.0 at % or less.

Among Fe, Ni, and Co, Fe is superior in terms of cost. Also, an element with a smaller atomic radius is more advantageous than an element with a larger atomic radius in obtaining a high saturation magnetic flux density while maintaining the stability of the amorphous phase. Accordingly, in the following, as an example, a chemical composition containing Fe as a main component of the magnetic metal layer 3 and at least one element selected from the group consisting of B, Si, P and C will be described. In addition, in this example, the total amount of Fe, B, Si, P, C, arbitrary elements (Cu, Ti, Zr, Hf, V, Nb, Ta, Cr, Mo, W, Mn, Co, Ni, Cu, Ag, Zn, Al, Sn, As, Sb, Bi and rare earth minerals (REM)) and impurities is 100 at %.

Fe has ferromagnetism and increases saturation magnetic flux density. Therefore, the amount of Fe is preferably 65.0 at % or more, more preferably 70.0 at % or more, more preferably 75.0 at % or more, more preferably 79.0 at % or more, even more preferably 81.0 at % or more, and most preferably 83.0 at % or more. On the other hand, in order to increase the stability of the amorphous phase, the amount of Fe is preferably 92.0 at % or less, more preferably 88.0 at % or less, more preferably 86.0 at % or less, and most preferably 85.0 at % or less.

B particularly enhances the thermal stability of the amorphous phase. Therefore, the amount of B is preferably 0.1 at % or more, more preferably 1.0 at % or more, more preferably 5.0 at % or more, even more preferably 7.5 at % or more, and most preferably 8.0 at % or more. On the other hand, in order to obtain a high saturation magnetic flux density, the amount of B is preferably 16.0 at % or less, more preferably 13.0 at % or less, even more preferably 11.0 at % or less, even more preferably 10.0 at % or less, and most preferably 9.4 at % or less. Depending on the amount of Si, P and C, the amount of B may be 0 at %.

Si enhances the thermal stability of the amorphous phase and raises the temperature at which compound phases are formed during heat treatment. Therefore, the amount of Si is preferably 0.1 at % or more, more preferably 0.2 at % or more, more preferably 0.5 at % or more, even more preferably 1.0 at % or more, and most preferably 2.0 at % or more. In addition, Si can form a silica surface film by oxidation, and imparts insulating properties and corrosion resistance to the magnetic metal layer. In this case, the amount of Si is preferably 8.0 at % or more, and more preferably 10.0 at % or more. On the other hand, in order to obtain a high saturation magnetic flux density, the amount of Si is preferably 15.0 at % or less, more preferably 10.0 at % or less, more preferably 8.0 at % or less, even more preferably 5.0 at % or less, and most preferably 4.0 at % or less. Depending on the amount of B, P and C, the amount of Si may be 0 at %.

P enhances the thermal stability of the amorphous phase and keeps the crystal grains fine during heat treatment. Therefore, the amount of P is preferably 0.1 at % or more, more preferably 1.0 at % or more, even more preferably 2.0 at % or more, and most preferably 3.0 at % or more. On the other hand, in order to obtain a high saturation magnetic flux density, the amount of P is preferably 15.0 at % or less, more preferably 10.0 at % or less, even more preferably 8.0 at % or less, and most preferably 5.0 at % or less. Depending on the amount of B, Si and C, the amount of P may be 0 at %.

C enhances the thermal stability of the amorphous phase. Therefore, the amount of C is preferably 0.1 at % or more, more preferably 0.5 at % or more, and most preferably 1.0 at % or more. On the other hand, in order to obtain a high saturation magnetic flux density, the amount of C is preferably 10.0 at % or less, more preferably 8.0 at % or less, even more preferably 5.0 at % or less, and most preferably 3.0 at % or less. Depending on the amount of B, Si and P, the amount of C may be 0 at %.

Further, in order to stably disperse crystal grains in the amorphous phase and stably increase the saturation magnetic flux density by an easily available heat treatment method, for example, the magnetic metal layer 3 may contain Cu as an optional element. The amount of Cu is preferably 0.1 at % or more, more preferably 0.4 at % or more, even more preferably 0.5 at % or more, and most preferably 0.6 at % or more. From the viewpoint of maintaining the thermal stability and high saturation magnetic flux density of the amorphous phase, the amount of Cu is preferably 2.0 at % or less, more preferably 1.5 at % or less, even more preferably 1.1 at % or less, even more preferably 1.0 at % or less, and most preferably 0.9 at % or less. The amount of Cu may be 0 at %.

In addition to the above, in order to provide additional effects related to the above properties and other properties, for example, the magnetic metal layer 3 may contain at least one selected from the group consisting of titanium (Ti), Zr, Hf, vanadium (V), Nb, tantalum (Ta), Cr, molybdenum (Mo), tungsten (W), manganese (Mn), Co, Ni, Ag, Zn, Al, Sn, Arsenic (As), antimony (Sb), bismuth (Bi) and REM as an optional element. Among these elements, Co is expensive, but its combination with Fe greatly improves the saturation magnetic flux density. Therefore, the amount of Co is preferably 0.1 at % or more, more preferably 1.0 at % or more, and most preferably 3.0 at %. Considering the cost advantage of using Fe as the main component, the amount of Co may be half the amount of Fe or less than 30.0 at %. In addition, Ni can improve corrosion resistance without significantly lowering the saturation magnetic flux density. Therefore, the amount of Ni is preferably 0.1 at % or more, more preferably 1.0 at % or more, and most preferably 3.0 at %. Considering the cost advantage of using Fe as the main component, the amount of Ni may be 15.0 at % or less. The total amount of Fe, Ni and Co is preferably 65.0 to 90.0 at %. From the viewpoint of maintaining a high saturation magnetic flux density even when adding additional effects related to the above characteristics and other characteristics, the total amount of Ti, Zr, Hf, V, Nb, Ta, Cr, Mo, W, Mn, Ag, Zn, Al, Sn, As, Sb, Bi and REM is preferably 8.0 at % or less, more preferably 5.0 at % or less, even more preferably 3.0 at % or less, and most preferably 1.0 at % or less. It is preferable that the total amount of Fe, Ti, Zr, Hf, V, Nb, Ta, Cr, Mo, W, Mn, Co, Ni, Ag, Zn, Al, Sn, As, Sb, Bi and REM is 65.0 to 90.0 at %. These optional elements may be 0 at %. It should be note that REM means scandium (Sc), yttrium (Y), lanthanum (La), cerium (Ce), praseodymium (Pr), neodymium (Nd), promethium (Pm), samarium (Sm), europium (Eu), gadolinium (Gd), terbium (Tb), dysprosium (Dy), holmium (Ho), erbium (Er), thulium (Tm), ytterbium (Yb) and lutetium (Lu).

In addition to the above, the magnetic metal layer 3 may contain inevitable impurities. However, the amount of impurities is preferably 0.5 at % or less, more preferably 0.1 at % or less, even more preferably 0.05 at % or less, and most preferably 0.01 at % or less. For example, impurities include, but are not limited to, O, N, S, Pb and Cd. Impurities may be 0 at %.

Therefore, in one embodiment of the present invention, in the magnetic metal layer containing an amorphous phase, the total amount of Fe, Ni and Co is 65.0 to 90.0 at %, the amount of Cu is 0 to 2.0 at %, the total amount of Ti, Zr, Hf, V, Nb, Ta, Cr, Mo, W, Mn, Ag, Zn, Al, Sn, As, Sb, Bi and REM is 0 to 8.0 at %, and the rest is at least one selected from the group consisting of B, Si, P and C and impurities, wherein the total amount of Fe, Ti, Zr, Hf, V, Nb, Ta, Cr, Mo, W, Mn, Co, Ni, Ag, Zn, Al, Sn, As, Sb, Bi and REM is 65.0 to 90.0 at %.

Further, in another embodiment of the present invention, in the magnetic metal layer containing an amorphous phase, the total amount of Fe, Ni and Co is 65.0 to 92.0 at %, the amount of Cu is 0 to 2.0 at %, the total amount of Ti, V, Ta, Cr, Mo, W, Mn, Ag, Zn, Al, Sn, As, Sb, Bi and REM is 0 to 8 0 at %, the total amount of B, Si, P and C is 0 to 10.0 at %, and the rest is at least one selected from the group consisting of Zr, Hf and Nb and impurities.

Further, in another embodiment of the present invention, in the magnetic metal layer containing an amorphous phase, the amount of Fe is 79.0 to 88.0 at %, the amount of B is 5.0 to 15.0 at %, the amount of Si is 0 to 8.0 at %, and the amount of P is 1.0 to 8.0 at %, the amount of C is 0 to 5.0 at %, the amount of Cu is 0 to 1.4 at %, the total amount of Ti, Zr, Hf, V, Nb, Ta, Cr, Mo, W, Mn, Ag, Zn, Al, Sn, As, Sb, Bi and REM is 0 to 8.0 at %, the total amount of Fe, Ti, Zr, Hf, V, Nb, Ta, Cr, Mo, W, Mn, Co, Ni, Ag, Zn, Al, Sn, As, Sb, Bi and REM is 79.0 to 88.0 at %, and the total amount of Fe, B, Si, P, C, Cu, Ti, Zr, Hf, V, Nb, Ta, Cr, Mo, W, Mn, Co, Ni, Ag, Zn, Al, Sn, As, Sb, Bi and REM is 100%.

In this example, the alloy composition disclosed in WO 2010/021130 can be suitably used as the magnetic metal layer 3 containing an amorphous phase. Accordingly, the disclosure of WO 2010/021130 is hereby incorporated by reference in its entirety to the extent it does not contradict the content of this specification.

For example, in the case of stably dispersing crystal grains in the amorphous phase, for emphasizing the synergistic effect (crystal grain refinement) of P and Cu, the ratio of the amount of Cu (at %) to the amount of P (at %) is preferably 0.08 to 0.80, more preferably 0.08 to 0.55.

Further, for example, when the composition formula is $Fe_aB_bSi_cP_xC_yCu_z$ apart from impurities, it is preferable that the amount (a) of Fe is 79.0 to 88.0 at %, the amount (b) of B is 5.0 to 15.0 at %, the amount (c) of Si is 0 to 8.0%, amount (x) of P is 1.0 to 8.0 at %, the amount (y) of C is 0 to 5.0 at %, and the amount (z) of Cu is 0 to 1.4 at %.

When the thickness of the magnetic metal layer 3 is sufficiently large, the strength of the magnetic metal layer 3 is sufficiently high, so that the workability of the laminate 1 can be improved. Therefore, it is preferable that the thickness of the magnetic metal layer 3 is 4 μm or more. Further, when the thickness of the magnetic metal layer 3 is large, the electromagnetic wave shielding effect of the magnetic metal layer 3 increases. Therefore, the thickness of the magnetic metal layer 3 is more preferably 10 μm or more, more preferably 15 μm or more, and even more preferably 20 μm or more. When the thickness of the magnetic metal layer 3 is sufficiently small, the strength of the magnetic metal layer 3 is sufficiently small, so that the formability of the laminate 1 can be sufficiently improved. Therefore, the thickness of the magnetic metal layer 3 is preferably 100 μm or less, more preferably 50 μm or less, even more preferably 45 μm or less, and most preferably 40 μm or less. When the laminate 1 includes a plurality of magnetic metal layers 3, it is possible that one magnetic metal layer s has a thickness within the above range, and it is possible that a part of the magnetic metal layers have a thickness within the above range, and it is possible that all the magnetic metal layers 3 have a thickness within the above range.

Moreover, the laminate 1 may optionally include a magnetic metal layer 3 that does not contain an amorphous phase. For example, in order to improve environmental resistance such as heat resistance and corrosion resistance, to improve the adhesion between layers, and to improve the shielding ability of the laminate against DC magnetic fields, the magnetic metal layer 3 may contain at least one selected from the group consisting of Fe, Ni and Co. In particular, for enhancing environmental resistance such as heat resistance and corrosion resistance, it is preferable that the magnetic metal layer 3 exists on the outermost surface of the laminate. Examples of such a magnetic metal layer 3 include Ni and Fe—Ni. Such Ni and Fe—Ni can be formed not only by laminating foils but also by plating or vapor deposition.

In addition to the non-magnetic metal layer 2 and the magnetic metal layer 3, the laminate 1 may optionally include a non-metallic layer 4. For example, in order to improve environmental resistance such as heat resistance and corrosion resistance, and to improve adhesion between layers, the non-metallic layer 4 may contain a chromium compound. In addition, the non-metallic layer 4 may contain a polymer in order to enhance adhesion between layers. For example, the polymer may be at least one selected from acrylic resin, epoxy resin, urethane resin, polyester, silicone resin, polyvinyl acetate, styrene-butadiene rubber, nitrile rubber, phenol resin, and cyanoacrylate. From the viewpoint of cost, the polymer is preferably urethane resin, polyester resin, or polyvinyl acetate. Further, for example, the non-metallic layer 4 may include an insulating layer in order to impart insulation between layers or on the surface. In particular, the non-metallic layer 4 is preferably present on the outermost surface of the laminate 1 in order to improve environmental resistance such as heat resistance and corrosion resistance. In order to enhance the electromagnetic wave shielding effect of the laminate 1 per unit thickness, the thickness of the non-metallic layer 4 is preferably 20 μm or less, more preferably 15 μm or less, even more preferably 10 μm or less, and most preferably 5 μm or less. Moreover, the thickness of the non-metallic layer 4 may be 0.1, 1.0, 1.5 or 2.0 μm or more.

2. Method for Manufacturing Laminate

Figure 3:
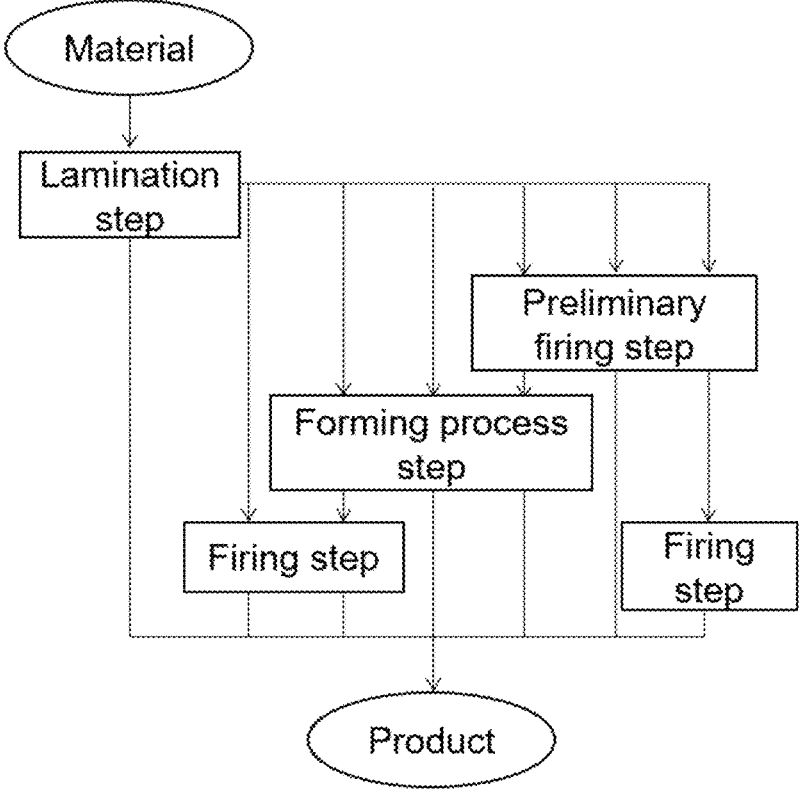
FIG. 3 is a flow chart of a method for manufacturing a laminate according to another embodiment of the invention.

According to another embodiment of the present invention, a method for manufacturing a laminate comprises a lamination step of laminating a material comprising a non-magnetic metal and material comprising a magnetic metal containing an amorphous phase (amorphous magnetic metal) to form an unfired laminate, as shown in the flow chart of FIG. 3. By this lamination step, the non-magnetic metal layer and the magnetic metal layer described above are formed. The materials used for these layers and the configurations of the layers are as described above, so they are omitted here.

When forming process is required according to the application, a forming process step of forming the unfired laminate into a predetermined shape may be included. This forming process may include, for example, cutting, punching, deep drawing, bulging, bending, and the like.

For increasing the crystallinity of the amorphous magnetic metal to enhance the electromagnetic wave shielding effect of the laminate, or to reduce the distortion caused by the forming process, it is preferable that the manufacturing method includes a firing step. In this firing step, a fired laminate is formed from the unfired laminate, or a preliminarily fired laminate, which will be described later. However, since the amorphous magnetic metal becomes brittle as the crystallinity increases, it is preferable to include the firing step after the forming process step. The crystallinity of the amorphous magnetic metal obtained by the firing step is preferably 10% or more, more preferably 20% or more, more preferably 30% or more, more preferably 40% or more, even more preferably 50% or more, even more preferably 60% or more, even more preferably 70% or more, even more preferably 80% or more, and most preferably 90% or more. This crystallinity may be 100% or less or less than 100%. It is preferable to change the heat treatment conditions according to the material. For example, the heat treatment temperature may be 350 to 650° C., and is preferably higher than the temperature at which the metal crystal phase precipitates and lower than the temperature at which a compound crystal phase does not precipitate. The heat treatment time may be, for example, 1 to 3600 seconds.

In addition, a preliminary firing step may be included between the lamination step and the forming process step in order to stably perform crystallization after the forming process step or to adjust the formability in the forming process step. In this preliminary firing step, a preliminarily fired laminate is formed from the unfired laminate. In order to maintain the formability in the forming process step, the crystallinity of the amorphous magnetic metal obtained in the preliminary firing step is preferably 75% or less, more preferably 60% or less, more preferably 50% or less. more preferably 40% or less, more preferably 30% or less, even more preferably 20% or less, and most preferably 10% or less. This crystallinity may be 0% or more, or may be 5% or more. In addition, in order to ensure the stability of crystallization in the firing step, the crystallinity of the amorphous magnetic metal obtained in the preliminary firing step is preferably 10% or more, more preferably 20% or more, and most preferably 50% or more.

The manufacturing method of non-magnetic metal and amorphous magnetic metal is not limited. For example, when the non-magnetic metal is copper foil, the copper foil may be a rolled copper foil, an electrolytic copper foil, or a metallized copper foil. Further, the magnetic metal containing the amorphous phase may be manufactured by either gas phase or liquid phase quenching method. For example, as such a manufacturing method, in the case of ribbons, a single roll method, a twin roll method, a thermal spraying method, a plating method and a vapor deposition method can be mentioned. In the case of powder, in addition to a method of pulverizing a ribbon, a water atomization method and a gas atomization method can be mentioned. Non-magnetic metals and amorphous magnetic metals with additional treatments may be used. For example, the amorphous magnetic metal may be preliminarily heat-treated in order to adjust the amount of pre-existing strain in the amorphous magnetic metal and reduce warpage due to dimensional changes in the material after a heat treatment. Even in these cases, the crystallinity is not limited. However, if sufficient formability is required, the crystallinity is preferably 0 to 5%. In addition, for example, for the purpose of imparting additional electromagnetic wave shielding effect, environmental resistance and adhesion to the laminate, materials which have been subjected to various plating (Au, Ag, Sn, Ni, Fe—Ni alloy, Zn, Sn alloy [Sn—Ag, Sn—Ni, Sn—Cu]), various chemical conversion treatments (chromate treatment) and roughening treatments may be used as the non-magnetic metal and the amorphous magnetic metal. In terms of both environmental resistance and cost, it is preferable that the material includes Sn plating or Sn alloy plating. From the viewpoint of adhesion, it is preferable to use a roughened material. A plurality of these additional treatments may be performed on the materials.

In the lamination step, when the layers are adhered without using an adhesive, for example, a surface activated bonding method may be used. In this surface activated bonding method, the surface of a non-magnetic metal and the surface of an amorphous magnetic metal are activated, and the activated surfaces of both metals are brought into contact and bonded. For the contact, crimping by overlapping rolls can be used. Methods for activating the surfaces of both metals include, for example, an ion etching method and a dry film forming method in vacuum. The surface activation method of each metal may be the same or different. In addition, when using an adhesive, for example, an adhesive compatible with the polymer described above (for example, polyol and isocyanate in the case of urethane resin) can be used. In this case, it is preferable to compare the heat treatment conditions of the adhesive and the heat treatment conditions of the amorphous magnetic metal, and adjust the heat treatment of the amorphous magnetic metal so that the adhesive does not deteriorate.

Further, in order to impart aesthetics, environmental resistance, and other characteristics to the laminate, the surface of the laminate may be subjected to a surface treatment in a final step. As part of this surface treatment, for example, an additional lamination step may be applied if adhesive lamination is required. A heat treatment may be performed after this additional lamination step. In this case, when an adhesive or polymer is used, the heat treatment temperature is preferably lower than the heat resistance temperature of the adhesive or polymer.

The laminated body as a product may be the unfired laminated body, the preliminarily fired laminated body, or the fired laminated body, regardless of the presence or absence of forming. Even the unfired laminate or the preliminarily fired laminate can be used as they are if they have a sufficient shielding effect against electromagnetic waves. It is preferable to adjust the crystallization of the amorphous magnetic metal according to the purpose.

The electromagnetic wave shielding material according to the above embodiments is particularly applicable to usages in various electromagnetic wave shielding applications, such as covering material or exterior material for electric/electronic device (for example, inverters, communication devices, resonators, electron tubes/discharge lamps, electric heating devices, electric motors, generators, electronic components, printed circuits, medical devices, and the like), covering material for harnesses and communication cables connected to electric/electronic device, electromagnetic wave shielding sheets, electromagnetic wave shielding panels, electromagnetic wave shielding bags, electromagnetic wave shielding boxes, electromagnetic wave shielding chambers.

Examples

Examples of the present invention are shown below together with Comparative Examples. However, they are provided for a better understanding of the invention and its advantages, and are not intended to be limiting of the invention.

A rolled copper foil was used as the non-magnetic metal. This rolled copper foil was pure copper [non-magnetic (diamagnetic)] with a thickness of 12 μm, and had a conductivity of $58.0 \times 10^6$ S/m at 20° C. In addition, an amorphous metal ribbon manufactured by a single roll method was used as the amorphous magnetic metal. The amorphous metal ribbon had a metal crystal phase ratio of 0% (both sides of the ribbon were measured with a MiniFlex 600 manufactured by Rigaku Corporation under the conditions of a Cu target, a tube voltage of 40 kV, a tube current of 15 mA, a step size of 0.01°, and a scan speed of 10°/min [θ-2θ method]), a crystallinity of 0% (as defined), a thickness of 25 μm, and a saturation magnetic flux density of 1.57 T (the saturation mass magnetization of an 8×8 mm sample was measured by VSM-P7-15 manufactured by TOEI INDUSTRY CO., LTD., and the saturation magnetic flux density was obtained by multiplying this saturation mass magnetization by 4π and the density obtained by the Archimedes method), a coercive force (measured on a 10×70 mm sample with Model BHS-40 manufactured by Riken Denshi Co., Ltd.) of 16.5 A/m. The chemical composition is $Fe_{84.8}B_{9.4}Si_{0.5}P_{3.5}Cu_{0.8}C_{1.0}$ (at %) [magnetic (ferromagnetic)], and the amount of impurities (the total amount of elements excluding the six elements mentioned above) was no more than 0.1 at %. The copper foil and the amorphous metal ribbon were cut so that the length and width were approximately the same.

In Examples 1 to 5, the surface of the rolled copper foil and the surface of the amorphous metal ribbon were activated by ion etching (plasma) and bonded by roll rolling (surface activated bonding). By this bonding, an unfired laminate was formed, and the copper foil constituted the non-magnetic metal layer, and the amorphous metal ribbon constituted the magnetic metal layer containing an amorphous phase. A part of the unfired laminates of these Examples was passed through a furnace having a furnace length of 0.75 m set at 455° C. at a speed of 1.5 m/min to crystallize part of the magnetic metal layer thereby preparing a preliminarily fired laminate (preliminary firing step) [crystallinity 53%] (measured with a DSC8500 manufactured by PerkinElmer Co., Ltd. at a heating rate of 40° C./min for a 20 mg sample). In addition, a part of the unfired laminate and the preliminarily fired laminate of the Example were heated to 425° C. at a heating rate of 1° C./min in a furnace while being kept flat, held for 10 minutes, and then cooled in the furnace. Thus, the magnetic metal layer was sufficiently crystallized to form a fired laminate (firing step) [crystallinity: 99% or more]. In addition, the maximum value of differential relative permeability (measured by Model BHS-40 manufactured by Riken Denshi Co., Ltd.) was $1.5 \times 10^4$, $1.2 \times 10^3$ and $6.9 \times 10^3$ for Examples 1, 4 and 5, respectively. Similarly, the value obtained by dividing the maximum value of the first differential relative permeability (longitudinal direction) by the maximum value of the second differential relative permeability (width direction) was 0.94, 0.97 and 1.01 for Examples 1, 4 and 5, respectively. In addition, the value obtained by dividing the difference between the maximum value of the first differential relative permeability and the maximum value of the second differential relative permeability by the maximum value of the differential relative permeability were $6.3 \times 10^{-2}$, $2.6 \times 10^{-2}$ and $9.9 \times 10^{-3}$ for Examples 1, 4 and 5, respectively.

In Example 6, the amorphous metal ribbon was passed through a furnace with a furnace length of 0.75 m set at 490° C. at a rate of 1.0 m/min to partially crystallize the amorphous metal ribbon [crystallinity: 60%, saturation flux density: 1.75 T]. This crystallized amorphous ribbon was adhered to a copper foil (thickness: 12 μm) with an adhesive to form a laminate. By this adhesion, the non-magnetic layer (resin film [derived from the adhesive]) was in contact with the non-magnetic metal layer (copper foil), and the magnetic metal layer (amorphous metal ribbon) containing an amorphous phase was in contact with this non-magnetic layer. A urethane adhesive was used as the adhesive, so the non-magnetic layer was a urethane resin layer. In Examples 1 to 6, each layer was laminated so that the end faces of each layer were aligned.

In Comparative Example 1, a copper foil (thickness: 12 μm) was used as it was (corresponding to a configuration of non-magnetic metal layer only). In Comparative Example 2, an amorphous metal ribbon (thickness: 25 μm) was used as it was (corresponding to a configuration of magnetic metal layer only).

In Table 1, in addition to the layer structures of the actual laminate, the firing configurations, the crystallinity of the magnetic metal layer, and the average crystal grain size are described.

Evaluation of Electromagnetic Wave Shield Effect

The laminate of each Example and each Comparative Example was installed in an electromagnetic wave shielding effect evaluation device (Techno Science Japan Co., Ltd., model TSES-KEC), and the electromagnetic wave shielding effect was evaluated by the KEC method under conditions of frequencies of 500 kHz and 1 MHz and a temperature of 20° C. The evaluation criteria are as follows.

Comprehensive Evaluation of Magnetic Field Shield Effect

A: Both evaluations at 500 kHz and 1 MHz are A

B: Either of evaluation at 500 kHz or 1 MHz is B

C: Either of evaluation at 500 kHz or 1 MHz is C

Formability

Figure 4A:
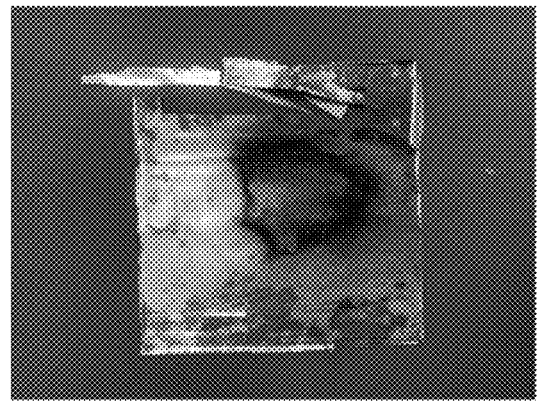
FIG. 4A is a view showing a laminate in which cracks occurred after forming (result of defective).
Figure 4B:
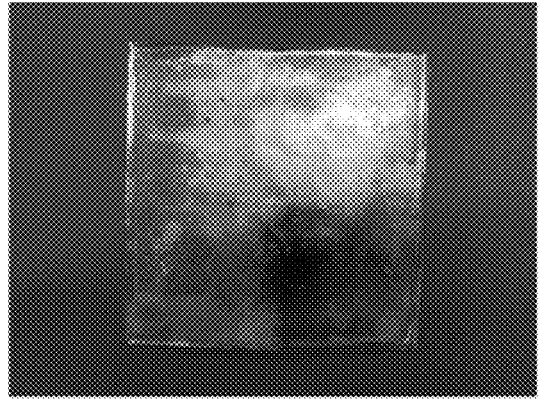
FIG. 4B is a view showing a laminate in which no cracks occurred after forming (result of good).

A 125 mm×125 mm test piece was cut out from the laminate of each Example and each Comparative Example, and the test piece was wound around a Φ18 mm round bar so that the copper foil was on the outside. After that, it was extended, and it was determined whether cracks had occurred on the front or back surfaces of the test piece. If a crack penetrating the non-magnetic metal layer or the magnetic metal layer was observed, it was evaluated as "B" (defective), and if no crack penetrating through either of the non-magnetic metal layer and the magnetic metal layer was observed, it was evaluated as "A" (good) (see FIGS. 4A and 4B). In addition, in cases where the forming process step was not performed, it was also evaluated as "A" (good).

TABLE 1

| | Non-magnetic metal layer | Magnetic metal layer | Pre-firing step | Firing step | Forming step | Form-ability | Shield effect | | | | Compre-hensive eval-uation | Configuration |
| | | | | | | | 500 kHz | | 1 MHz | | | |
| | | | | | | | Value | Eval-uation | Value | Eval-uation | | |
| --- | --- | --- | --- | --- | --- | --- | --- | --- | --- | --- | --- | --- |
| Example 1 | Yes | Yes | No | No | Yes | A | 29.0 | B | 34.7 | B | B | Nonmagnetic metal layer/ Magnetic metal layer |
| Example 2 | Yes | Yes | No | Yes | Yes* | A | 36.8 | A | 46.6 | A | A | Nonmagnetic metal layer/ Magnetic metal layer |
| Example 3 | Yes | Yes | No | Yes | No | A | 39.5 | A | 49.7 | A | A | Nonmagnetic metal layer/ Magnetic metal layer |
| Example 4 | Yes | Yes | Yes | No | Yes | A | 38.1 | A | 47.9 | A | A | Nonmagnetic metal layer/ Magnetic metal layer |
| Example 5 | Yes | Yes | Yes | Yes | Yes* | A | 40.4 | A | 51.4 | A | A | Nonmagnetic metal layer/ Magnetic metal layer |
| Example 6 | Yes | Yes | No | No | Yes | B | 40.1 | A | 49.7 | A | A | Non-magnetic metal layer/ Non-magnetic layer/ Magnetic metal layer |
| Comparative Example 1 | Yes | No | No | No | Yes | A | 18.9 | C | 24.2 | C | C | Non-magnetic metal layer |
| Comparative Example 2 | No | Yes | No | No | Yes | A | 9.7 | C | 12.5 | C | C | Magnetic metal layer |

*The forming process was performed before the firing process.

Evaluation of Shield Effect at Frequency of 500 kHz

A: Magnetic field shield effect is 35.0 dB or more

B: Magnetic field shield effect is 25.0 dB or more and less than 35.0 dB

C: Magnetic field shield effect is less than 25.0 dB

Evaluation of Shield Effect at Frequency of 1 MHz

A: Magnetic field shield effect is 40.0 dB or more

B: Magnetic field shield effect is 30.0 dB or more and less than 40.0 dB

C: Magnetic field shield effect is less than 30.0 dB

Table 1

According to Table 1, the laminate including the non-magnetic metal layer and the magnetic metal layer containing the amorphous phase had a higher electromagnetic wave shielding effect than the non-magnetic metal layer alone or the magnetic metal layer alone. Further, by appropriately adjusting the crystallinity of the magnetic metal layer containing the amorphous phase, it was possible to enhance the electromagnetic wave shielding effect in the low frequency region while ensuring sufficient formability. In addition, by providing the non-magnetic metal layer, a high electromagnetic wave shielding effect was also exhibited even in the medium to high frequency range.

The invention claimed is:

1. A laminate comprising at least one non-magnetic metal layer and at least one magnetic metal layer, wherein the at least one non-magnetic metal layer is selected from the group consisting of copper foil and copper alloy foil, and at least one of the at least one magnetic metal layer comprises an amorphous phase, and wherein the at least one magnetic metal layer comprising the amorphous phase has a crystallinity of 40% or more and 75% or less.

2. The laminate according to claim 1, wherein the laminate is a formed product.

3. The laminate according to claim 1, wherein the at least one non-magnetic metal layer has a thickness of 4 to 100 μm.

4. The laminate according to claim 1, wherein the at least one magnetic metal layer has a thickness of 4 to 100 μm.

5. The laminate according to claim 1, wherein a total thickness of the at least one non-magnetic metal layer and the at least one magnetic metal layer is 15 to 150 μm.

6. The laminate according to claim 1, wherein in the at least one magnetic metal layer comprising the amorphous phase, a total amount of Fe, Ni and Co is 65.0 to 90.0 at %, an amount of Cu is 0 to 2.0 at %, a total amount of Ti, Zr, Hf, V, Nb, Ta, Cr, Mo, W, Mn, Ag, Zn, Al, Sn, As, Sb, Bi and REM is 0 to 8.0 at %, and the rest is at least one selected from the group consisting of B, Si, P and C and impurities, and wherein a total amount of Fe, Ti, Zr, Hf, V, Nb, Ta, Cr, Mo, W, Mn, Co, Ni, Ag, Zn, Al, Sn, As, Sb, Bi and REM is 65.0 to 90.0 at %.

7. The laminate according to claim 1, wherein in the at least one magnetic metal layer comprising the amorphous phase, a total amount of Fe, Ni and Co is 65.0 to 92.0 at %, an amount of Cu is 0 to 2.0 at %, a total amount of Ti, V, Ta, Cr, Mo, W, Mn, Ag, Zn, Al, Sn, As, Sb, Bi and REM is 0 to 8.0 at %, a total amount of B, Si, P and C is 0 to 10.0 at %, and the rest is at least one selected from the group consisting of Zr, Hf and Nb and impurities.

8. The laminate according to claim 1, wherein in the at least one magnetic metal layer comprising the amorphous phase, an amount of Fe is 79.0 to 88.0 at %, an amount of B is 5.0 to 15.0 at %, an amount of Si is 0 to 8.0 at %, an amount of P is 1.0 to 8.0 at %, an amount of C is 0 to 5.0 at %, an amount of Cu is 0 to 1.4 at %, a total amount of Ti, Zr, Hf, V, Nb, Ta, Cr, Mo, W, Mn, Ag, Zn, Al, Sn, As, Sb, Bi and REM is 0 to 8.0 at %, a total amount of Fe, Ti, Zr, Hf, V, Nb, Ta, Cr, Mo, W, Mn, Co, Ni, Ag, Zn, Al, Sn, As, Sb, Bi and REM is 79.0 to 88.0 at %, and a total amount of Fe, B, Si, P, C, Cu, Ti, Zr, Hf, V, Nb, Ta, Cr, Mo, W, Mn, Co, Ni, Ag, Zn, Al, Sn, As, Sb, Bi and REM is 100%.

9. The laminate according to claim 1, wherein an electrical conductivity of the at least one non-magnetic metal layer is $30.0 \times 10^6$ S/m or more, and a saturation magnetic flux density of the at least one magnetic metal layer comprising the amorphous phase is 1.50 T or more.

10. The laminate according to claim 1, wherein the at least one non-magnetic metal layer and the at least one magnetic metal layer comprising the amorphous phase are in contact.

11. A method for manufacturing the laminate of claim 1, comprising a lamination step of forming an unfired laminate by laminating a material comprising the at least one non-magnetic metal and an unfired at least one amorphous magnetic metal layer.

12. The method for manufacturing the laminate according to claim 11, further comprising a firing step of firing the unfired laminate such that a crystallinity of the amorphous magnetic metal in the fired laminate is 40% or more and 75% or less.

13. The method for manufacturing the laminate according to claim 12, further comprising a forming process step of processing the unfired laminate into a predetermined shape before the firing step.

14. The method for manufacturing the laminate according to claim 13, further comprising a preliminary firing step of preliminarily firing the unfired laminate such that the crystallinity of the amorphous magnetic metal after the preliminary firing is increased to between 10% to 75% before the forming process step.

15. The method for manufacturing the laminate according to claim 11, wherein in the lamination step, the non-magnetic metal and the amorphous magnetic metal are bonded by a surface activated bonding method.

16. The laminate according to claim 1, wherein the at least one magnetic metal layer comprising the amorphous phase has a crystallinity of 50% or more and 75% or less.

* * * * *